United States Patent
Warren

(10) Patent No.: US 10,429,168 B2
(45) Date of Patent: Oct. 1, 2019

(54) EMBEDDED CAP PROBE

(71) Applicant: United Technologies Corporation, Farmington, CT (US)

(72) Inventor: Eli Cole Warren, Wethersfield, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 198 days.

(21) Appl. No.: 15/376,021

(22) Filed: Dec. 12, 2016

(65) Prior Publication Data

US 2017/0160070 A1    Jun. 8, 2017

Related U.S. Application Data

(63) Continuation of application No. 14/015,191, filed on Aug. 30, 2013, now Pat. No. 9,518,850.

(60) Provisional application No. 61/707,336, filed on Sep. 28, 2012.

(51) Int. Cl.

| | |
|---|---|
| *G01B 7/14* | (2006.01) |
| *F01D 11/20* | (2006.01) |
| *F01D 21/00* | (2006.01) |
| *G01D 11/30* | (2006.01) |
| *F01D 17/06* | (2006.01) |

(52) U.S. Cl.
CPC ............... *G01B 7/14* (2013.01); *F01D 11/20* (2013.01); *F01D 17/06* (2013.01); *F01D 21/003* (2013.01); *G01D 11/30* (2013.01); *F05D 2240/11* (2013.01); *F05D 2260/97* (2013.01)

(58) Field of Classification Search
CPC combination set(s) only.
See application file for complete search history.

(56) References Cited

U.S. PATENT DOCUMENTS

| | | | |
|---|---|---|---|
| 3,543,065 A | 11/1970 | Phelan | |
| 3,890,423 A | 6/1975 | Zacharias, Jr. | |
| 4,162,111 A | 7/1979 | Brown | |
| 4,384,819 A * | 5/1983 | Baker | G01S 13/88 324/175 |
| 4,455,754 A | 6/1984 | Benjamin | |
| 4,544,859 A | 10/1985 | Eoff | |
| 4,563,643 A * | 1/1986 | Leschek | G01N 27/9033 324/207.16 |
| 4,804,905 A * | 2/1989 | Ding | F01D 21/04 174/152 GM |
| 4,813,273 A * | 3/1989 | Parsons | F01D 21/04 73/112.01 |
| 5,101,165 A | 3/1992 | Rickards | |
| 5,119,036 A | 6/1992 | Rickards et al. | |

(Continued)

*Primary Examiner* — Harshad R Patel
*Assistant Examiner* — Tran M. Tran
(74) *Attorney, Agent, or Firm* — Cantor Colburn LLP

(57) ABSTRACT

A method for installing a probe assembly in a case of a gas turbine engine the method including installing a first portion of the probe assembly within a first section of the case, and installing a second portion of the probe assembly within a second section of the case. A case assembly within a gas turbine engine the case assembly including a case in at least one of a compressor and a turbine, and a probe assembly. The probe assembly including a first portion positioned within a bore of the case, and a second portion positioned within an inset of the case, the bore having a smaller diameter than the inset.

20 Claims, 11 Drawing Sheets

(56) References Cited

U.S. PATENT DOCUMENTS

| | | | |
|---|---|---|---|
| 5,140,494 A * | 8/1992 | Slade | F01D 21/04 324/660 |
| 5,166,626 A * | 11/1992 | Hester | G01B 7/14 324/683 |
| 5,818,242 A * | 10/1998 | Grzybowski | F01D 11/025 324/642 |
| 5,892,365 A * | 4/1999 | Bailleul | G01B 7/14 324/662 |
| 5,973,502 A * | 10/1999 | Bailleul | G01B 7/14 324/662 |
| 5,975,845 A * | 11/1999 | Ball | F01D 11/02 415/173.4 |
| 6,249,123 B1 * | 6/2001 | Rankin | F02P 17/12 324/393 |
| 6,268,683 B1 | 7/2001 | Li | |
| 6,374,676 B1 | 4/2002 | Arnold et al. | |
| 6,445,177 B1 * | 9/2002 | Higgins | B03C 1/286 324/204 |
| 6,546,824 B2 | 4/2003 | Easton | |
| 6,774,623 B2 | 8/2004 | Palfenier et al. | |
| 6,848,193 B1 | 2/2005 | Kirzhner | |
| 6,851,306 B2 | 2/2005 | Shost et al. | |
| 6,949,922 B2 * | 9/2005 | Twerdochlib | F01D 21/003 324/207.14 |
| 7,013,718 B2 * | 3/2006 | Ingistov | F01D 17/02 374/141 |
| 7,153,023 B2 | 12/2006 | Howard et al. | |
| 7,207,769 B2 * | 4/2007 | Tanioka | F01D 11/24 415/115 |
| 7,215,129 B1 | 5/2007 | Andarawis et al. | |
| 7,215,252 B2 * | 5/2007 | Schenck | F01D 11/06 324/623 |
| 7,259,552 B2 * | 8/2007 | Twerdochlib | F01D 21/003 324/207.16 |
| 7,283,096 B2 * | 10/2007 | Geisheimer | H01C 1/002 343/700 MS |
| 7,414,413 B2 | 8/2008 | Crum et al. | |
| 7,455,495 B2 * | 11/2008 | Leogrande | F01D 11/24 415/1 |
| 7,458,768 B2 * | 12/2008 | Dube | F01D 17/02 415/115 |
| 7,554,324 B2 | 6/2009 | Gualtieri | |
| 7,688,081 B2 | 3/2010 | Webster | |
| 7,876,093 B2 | 1/2011 | McMillen et al. | |
| 7,918,642 B2 * | 4/2011 | Leogrande | F01D 11/025 415/118 |
| 8,002,517 B2 | 8/2011 | Razzell et al. | |
| 8,344,741 B2 | 1/2013 | Sheikmanl et al. | |
| 8,513,960 B2 * | 8/2013 | Schneider | G01B 7/14 324/690 |
| 8,558,538 B2 | 10/2013 | Phillips et al. | |
| 8,773,115 B2 | 7/2014 | Phillips et al. | |
| 8,922,203 B2 | 12/2014 | Wickstead et al. | |
| 8,970,228 B2 | 3/2015 | Andarawis et al. | |
| 9,064,486 B2 | 6/2015 | Sato | |
| 9,279,336 B2 * | 3/2016 | Warren | F01D 11/20 |
| 9,291,069 B2 * | 3/2016 | Leogrande | F01D 11/025 |
| 9,316,479 B2 * | 4/2016 | Warren | G01B 7/22 |
| 9,551,632 B2 * | 1/2017 | Warren | G01M 15/14 |
| 9,726,777 B2 * | 8/2017 | Warren | G01V 3/088 |
| 9,856,748 B2 * | 1/2018 | Johnston | G01S 13/08 |
| 2013/0093413 A1 | 4/2013 | Itonaga et al. | |
| 2014/0064924 A1 * | 3/2014 | Warren | G01B 7/14 415/118 |
| 2018/0238673 A1 * | 8/2018 | Warren | G01B 7/14 |

\* cited by examiner

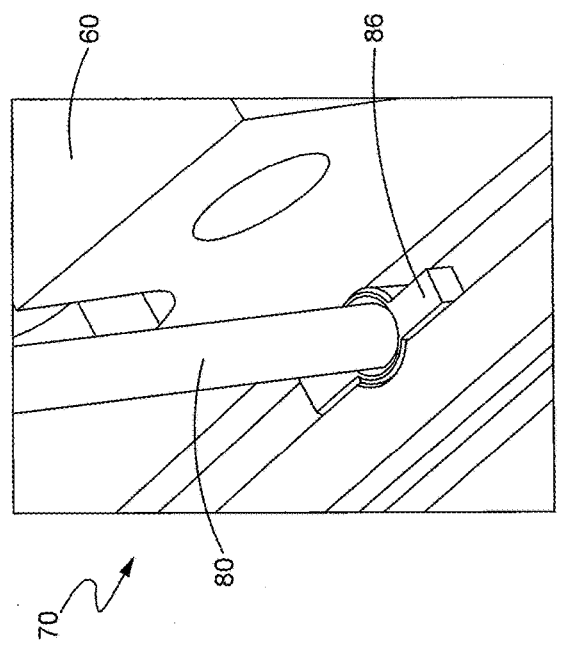
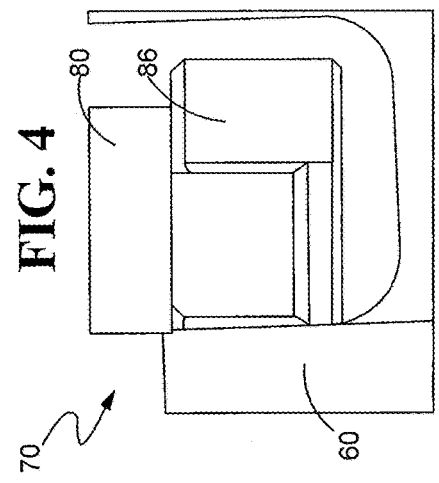
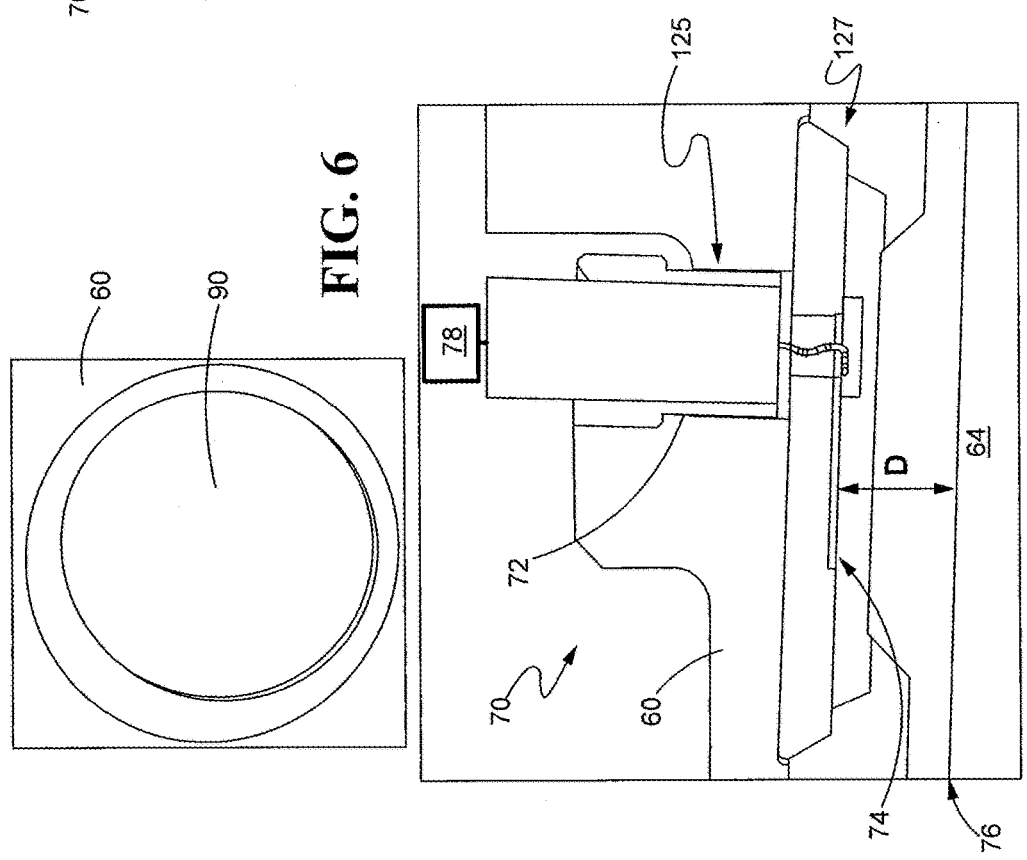

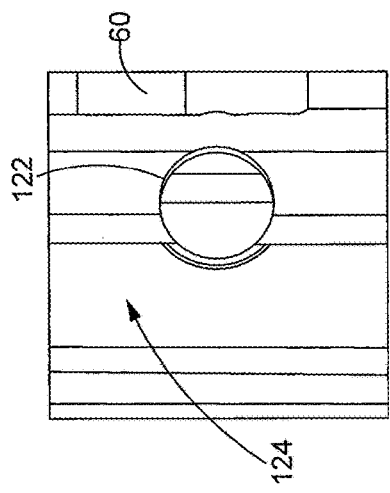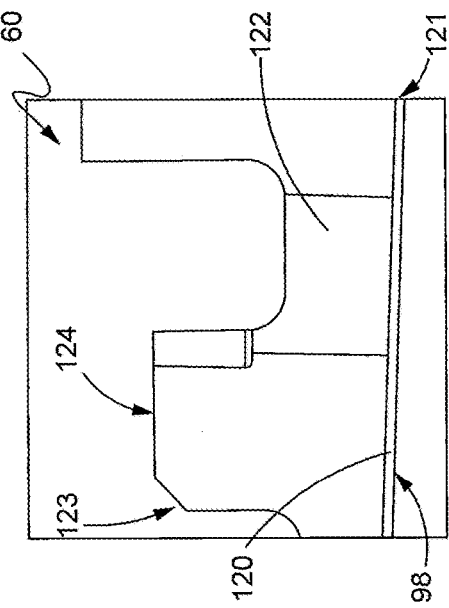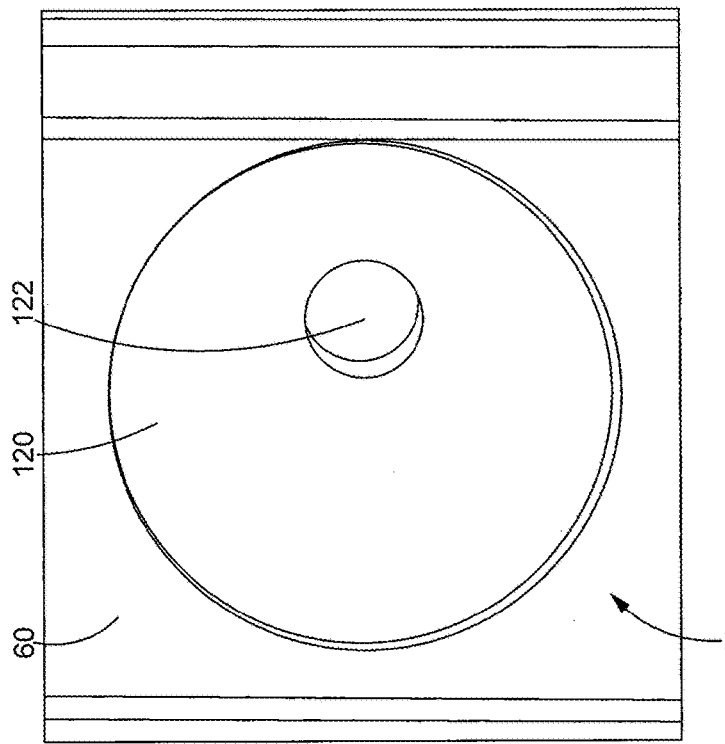

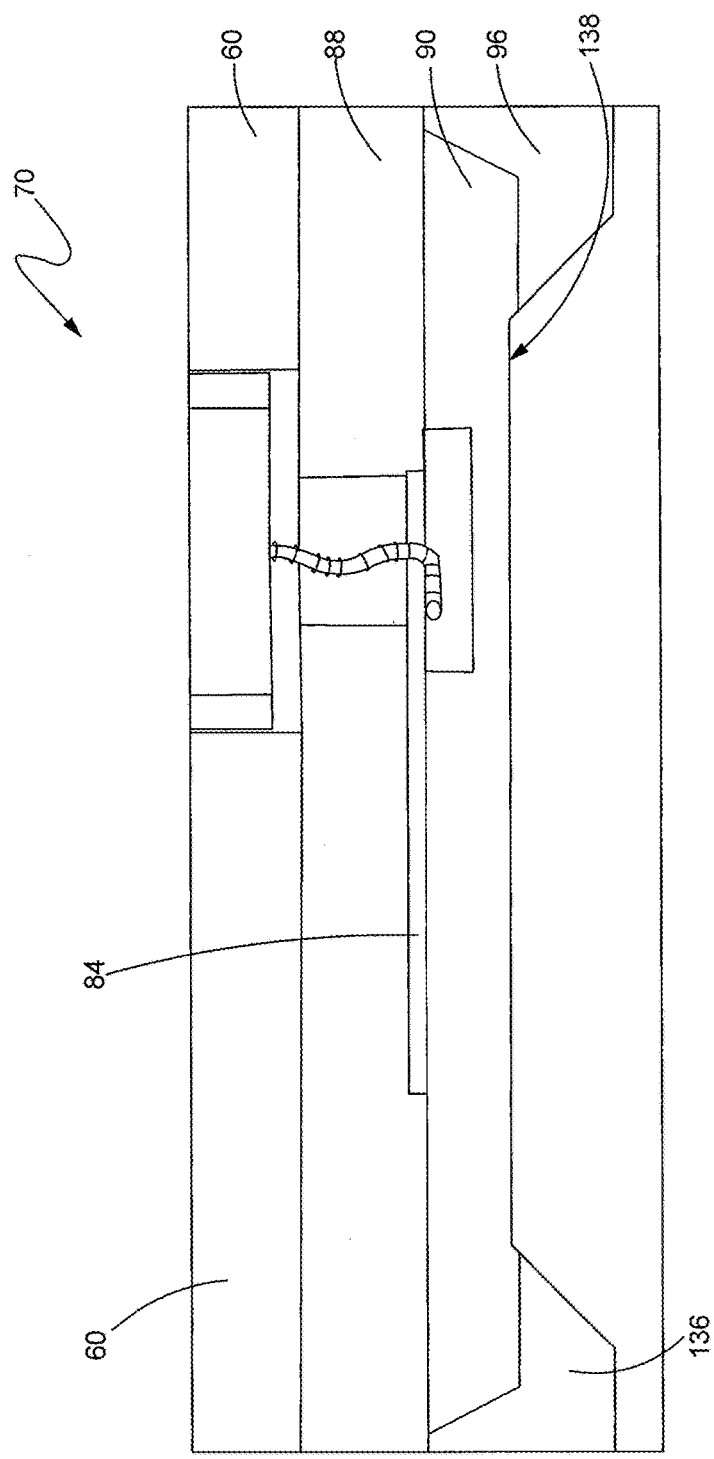
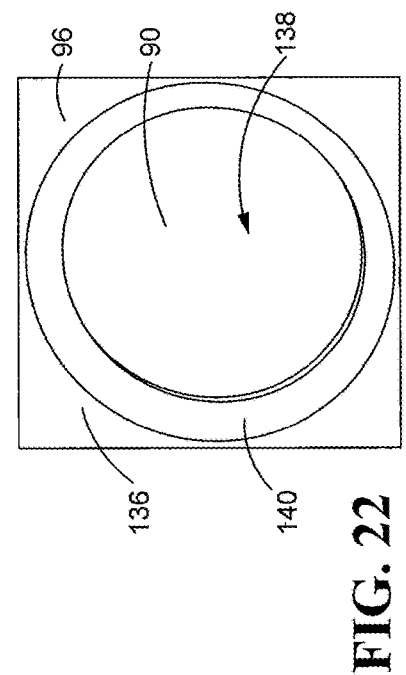
FIG. 21
FIG. 22

EMBEDDED CAP PROBE

CROSS REFERENCE TO RELATED APPLICATIONS

This application is a continuation of U.S. patent application Ser. No. 14/015,191 filed on August 30, 2013, which is a non-provisional claiming the 35 U.S.C. § 119(e) benefit of U.S. Provisional Patent Application Ser. No. 61/707,336 filed on Sep. 28, 2012, the contents of each of these applications are incorporated herein by reference thereto.

FIELD OF THE DISCLOSURE

The present disclosure is directed generally toward capacitance based clearance probes, and more specifically toward a capacitance-based clearance probe built into a metal surface.

BACKGROUND OF THE DISCLOSURE

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate.

The compressor and turbine sections include multiple rotors and stators configured to enable optimal operation. Gas turbine engines maintain an optimal clearance (distance) between the tips of the rotors and an outside diameter of a gas path within the turbine engine, and thereby provide the conditions necessary to achieve a desired performance.

The gas turbine engine performance is validated, in part, by measuring the blade tip clearance. In order to measure the tip clearance, one or more tip clearance probes are installed in the outer air seal wall of the turbine engine. As the tip clearance probes are incorporated onto the outer air seal of the gas turbine after the outer air seal has been manufactured, it is necessary to operate the outer air seal casing to accommodate the tip clearance probe. Existing tip clearance probe arrangements require the outer air seal casing to further accommodate the housing of the tip clearance probe, thereby limiting the locations on the outer air seal that can accept the tip clearance probe and requiring significant additional operation of the outer air seal.

SUMMARY OF THE DISCLOSURE

According to one embodiment of the present disclosure, a method for installing a probe assembly in a case of a gas turbine engine is disclosed. The method may comprise installing a first portion of the probe assembly within a first section of the case, and installing a second portion of the probe assembly within a second section of the case.

In another embodiment, the method may further comprise building the probe assembly into the case by piecemeal installation of the first and second portions, the probe assembly not being fully assembled before installation within the case.

In another embodiment, the method may further comprise using a seal coating to retain the probe assembly within the case.

In another embodiment, the method may further comprise preparing a bore in the first section of the case, and preparing an inset in the second portion of the case, the bore having a smaller diameter than the inset.

In another embodiment, the method may further comprise installing a sleeve and a lead within the bore of the case.

In another embodiment, the method may further comprise installing an outer ceramic pad within the inset of the case.

In another embodiment, the method may further comprise adhering a sensor face to the outer ceramic pad, and adhering an inner ceramic pad to the sensor face and outer ceramic pad.

In another embodiment, the method may further comprise attaching a sensor wire from the lead to the sensor face.

In another embodiment, the method may further comprise applying an abradable coating to the inner ceramic pad, outer ceramic pad, and case to locate and maintain a position of the probe assembly within the case.

In another embodiment, the method may further comprise removing a portion of the abradable coating to accommodate an electrical field of the sensor face.

According to another embodiment of the present disclosure, a case assembly within a gas turbine engine is disclosed. The case assembly may comprise a case in at least one of a compressor and a turbine, and a probe assembly. The probe assembly may include a first portion positioned within a bore of the case, and a second portion positioned within an inset of the case, the bore having a smaller diameter than the inset.

In another embodiment, the case assembly may further comprise a coating applied to the second portion and the case to retain the probe assembly within the case.

In another embodiment, the inset may be located on an inner side of the case, and the bore may extend from an outer surface of the case to the inset.

In another embodiment, the first portion may include a lead assembled to a sleeve, and the sleeve may be fixed to the bore.

In another embodiment, the second portion may include an outer ceramic pad fixed to the inset, a sensor face positioned within an inset of the outer ceramic pad, and an inner ceramic pad fixed to the sensor face and the outer ceramic pad.

In another embodiment, the lead may include a sensor wire, the sensor wire attached to the sensor face.

According to yet another embodiment of the present disclosure, a method for retaining a probe within a case of a gas turbine engine is disclosed. The method may comprise using a coating to retain the probe within the case.

In another embodiment, the method may further comprise applying the coating to inner surfaces of the probe and the case, the coating composed of abradable material.

In another embodiment, the method may further comprise removing a portion of the coating to accommodate an electric field between a sensor face of the probe and a blade tip.

In another embodiment, the method may further comprise beveling an edge of a remaining portion of the coating.

These and other aspects and features of the disclosure will become more readily apparent upon reading the following detailed description when taken in conjunction with the accompanying drawings. Although various features are disclosed in relation to specific exemplary embodiments of the invention, it is understood that the various features may be combined with each other, or used alone, with any of the various exemplary embodiments of the invention without departing from the scope of the invention.

BRIEF DESCRIPTION OF THE DRAWINGS

FIG. 3 is a cross-sectional view at line 3-3 in FIG. 2, according to one embodiment of the present disclosure;

FIG. 4 is a perspective view of FIG. 3, according to one embodiment of the present disclosure;

FIG. 5 is a side view of an enlarged portion of a probe assembly of FIG. 4, according to one embodiment of the present disclosure;

FIG. 6 is a perspective view of FIG. 3 from an inner diameter (ID) of the case, according to one embodiment of the present disclosure;

FIG. 9 is a perspective view of a section of the case of FIG. 3 from an ID of the case, according to one embodiment of the present disclosure;

FIG. 10 is a perspective view of the case of FIG. 9 from an outer diameter (OD) of the case, according to one embodiment of the present disclosure;

FIG. 11 is a side view of the case of FIG. 9, according to one embodiment of the present disclosure;

FIG. 21 is a cross-sectional view of a portion of the abradable coating of FIG. 20 removed, according to one embodiment of the present disclosure; and FIG. 22 is a perspective view of FIG. 21 from an ID of the case, according to one embodiment of the present disclosure.

While the present disclosure is susceptible to various modifications and alternative constructions, certain illustrative embodiments thereof, will be shown and described below in detail. It should be understood, however, that there is no intention to be limited to the specific embodiments disclosed, and the intention is to cover all modifications, alternative constructions, and equivalents along within the spirit and scope of the present disclosure.

DETAILED DESCRIPTION

Figure 1:
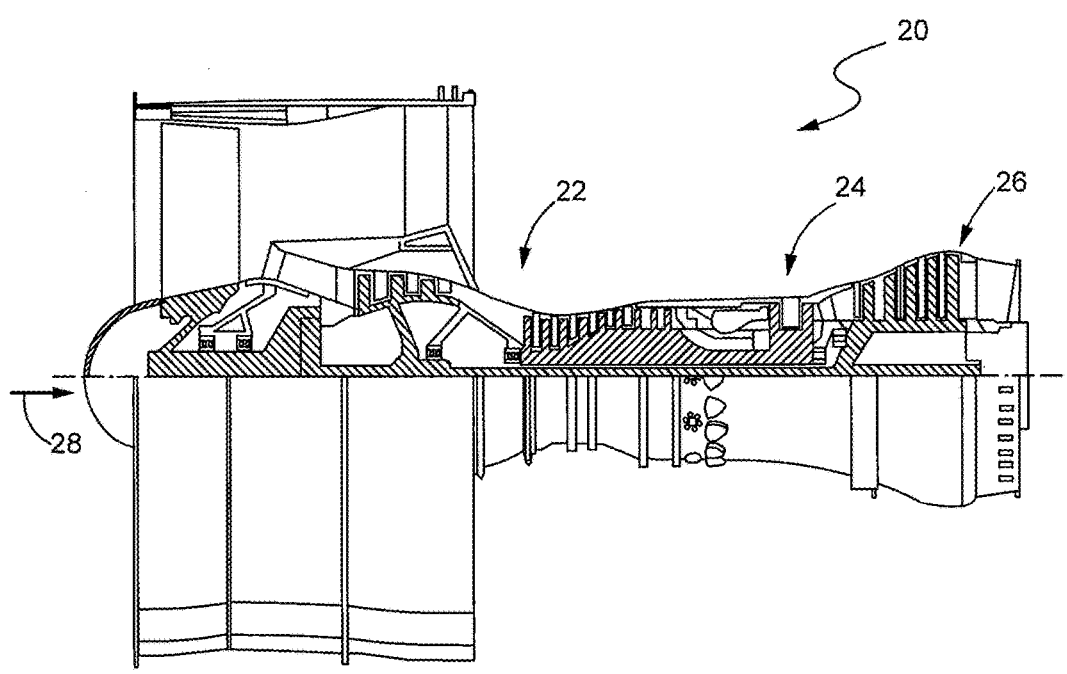
FIG. 1 is a partial cross-sectional view of a gas turbine engine, according to one embodiment of the present disclosure.
Figure 2:
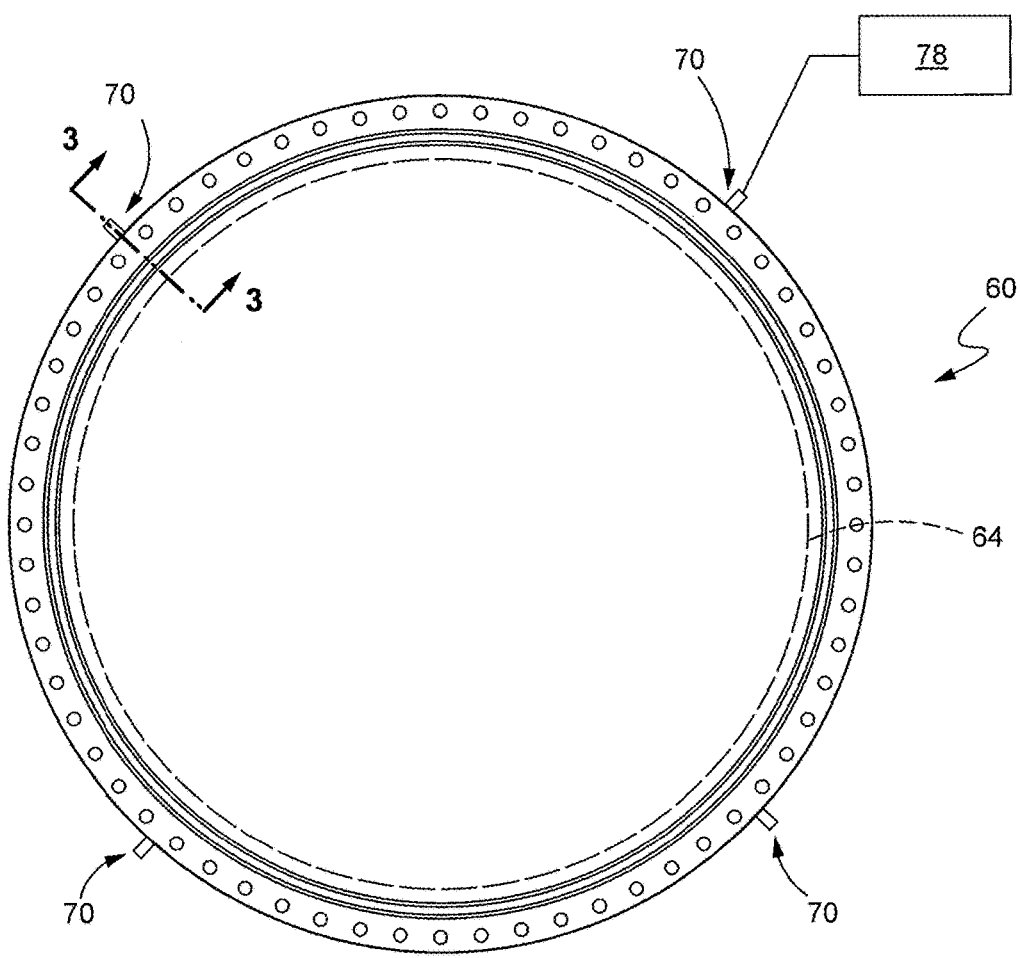
FIG. 2 is an aft view of a case of the gas turbine engine of FIG. 1, according to one embodiment of the present disclosure.
Figure 7:
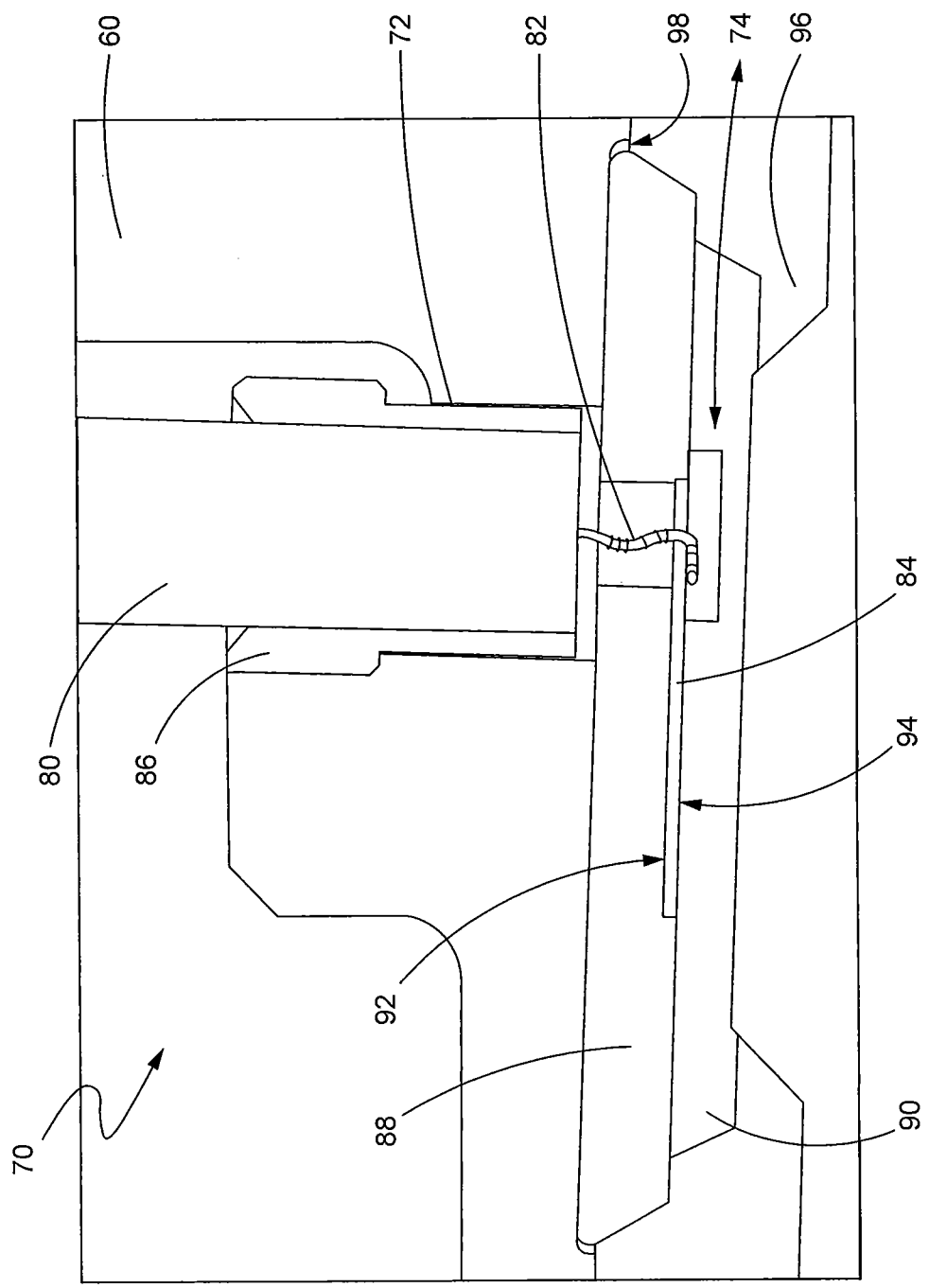
FIG. 7 is an enlarged cross-sectional view of the probe assembly built into the case of FIG. 3, according to one embodiment of the present disclosure.

Referring now to the drawings, and with specific reference to FIG. 1, in accordance with the teachings of the disclosure, an exemplary gas turbine engine 20 is shown. The gas turbine engine 20 may generally comprise a compressor section 22 where air is pressurized, a combustor 24 downstream of the compressor section which mixes and ignites the compressed air with fuel and thereby generates hot combustion gases, a turbine section 26 downstream of the combustor 24 for extracting power from the hot combustion gases, and an annular flow path 28 extending axially through each. The gas turbine engine 20 may be used on an aircraft for generating thrust or power, or in land-based operations for generating power as well.

Referring now to FIGS. 2-7, with continued reference to FIG. 1, an example case 60, such as a case surrounding the compressor section 24 or turbine section 28 of the engine 20, is shown. The case 60 circumscribes a blade array 64, which is shown in broken line form for clarity in FIG. 2.

The case 60 may hold one or more probe assemblies 70, such as capacitance based clearance probes, within respective apertures 72 of the case 60. For example, the probe assemblies 70 may be embedded in the case 60. The probe assemblies 70 may include sensors 74, such as capacitance sensors, that monitor a distance D between tips 76 of blades within the array 64 and the sensor 74. The distance D is monitored during operation of the engine 20. Identifying changes in the distance D is useful as is known and may identify areas having unacceptable wear and/or performance. The sensors 74 may be linked to a controller 78 that calculates the distance D based on the measured capacitance.

Each of the probe assemblies 70 may include an electric lead 80, which may connect the sensor 74 to the controller 78, or to any other system that is operable to receive and act upon sensor measurements, including via wireless communications. In an embodiment, the sensor 74 may comprise a sensor wire 82 extending from the lead 80, and a tack strap or sensor face 84 connected to the sensor wire 82. The probe assembly 70 may also include a sleeve 86, such as a ferrule, to locate the lead 80 in place within the case 60. An outer ceramic pad 88 and an inner ceramic pad 90 of the probe assembly 70 may surround sensor face 84 on the outer and inner surfaces 92, 94, respectively, of the sensor face 84, serving to insulate the sensor face 84. A seal coating 96, such as an abradable coating, may be applied to at least part of the probe assembly 70 and an inner diameter (ID) surface 98 of the case 60, in order to create a seal with the blade array 64. The seal coating 96 may also serve to locate and maintain the position of the probe assembly 70 within the case 60.

Figure 8:
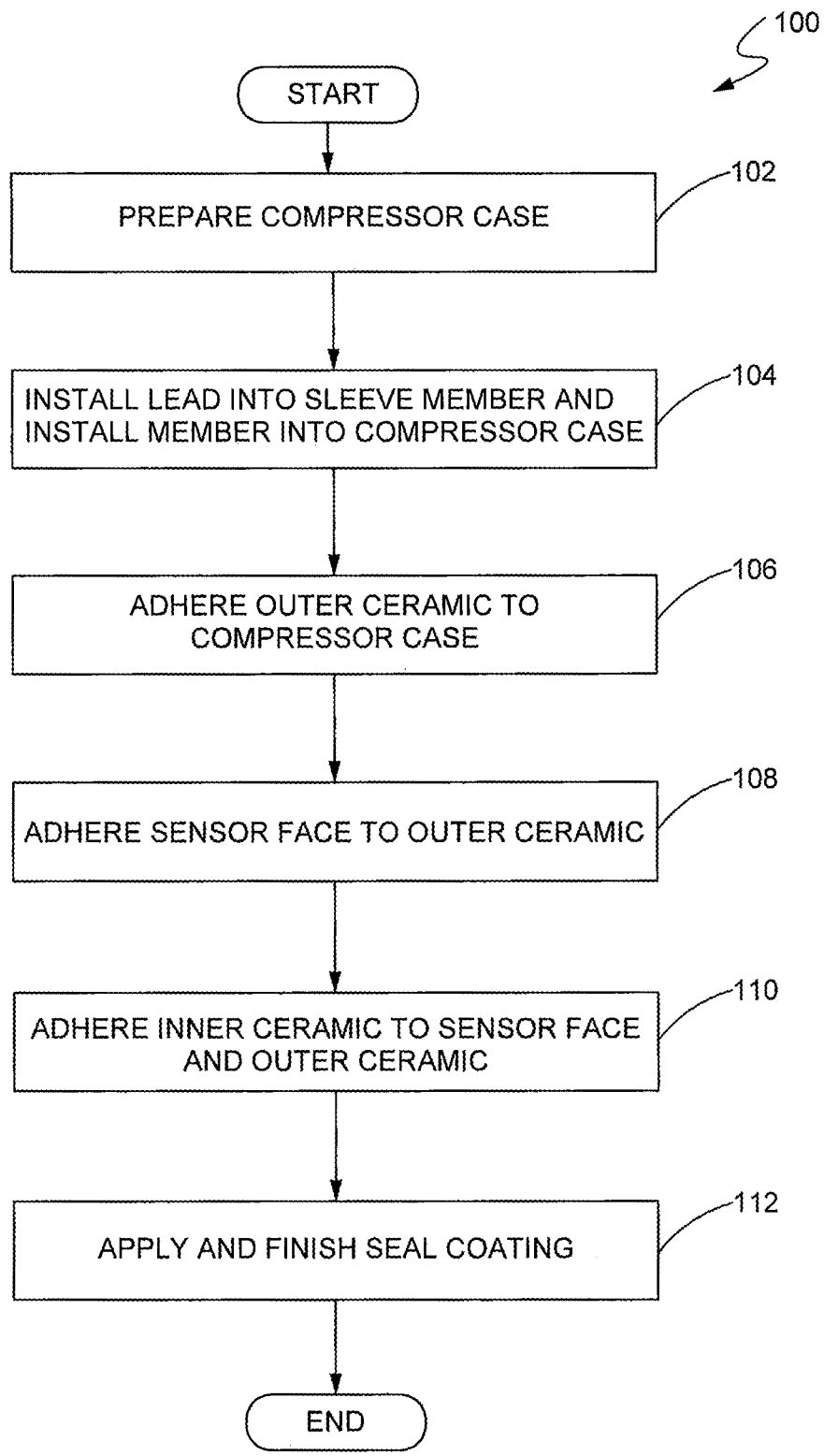
FIG. 8 is a flowchart outlining a method for installing the probe assembly of FIG. 7 within the gas turbine engine, according to one embodiment of the present disclosure.

Referring now to FIG. 8, with continued reference to FIGS. 1-7, an exemplary flowchart outlining a method 100 for installing the probe assembly 70 within the case 60 of the engine 20 is shown. The probe assembly 70 may be built into the case 60 by piecemeal installation. The probe assembly 70 may not be fully assembled before installation within the case 60 such that portions of the probe assembly 70 are installed within the case 60 separately.

At a first block 102, the case 60 may be prepared. For example, as shown best in FIGS. 9-11, a bore 122 may be cut through a first section 123 of the case 60, and a pocket or inset 120 may be formed in a second section 121 of the case 60. The bore 122 may accommodate placement of a first portion 125 of the probe assembly 70, such as the sleeve 86 containing the lead 80. Extending from an outer diameter (OD) surface 124 of the case 60 to the inset 120, the bore 122 may be sized to fit the sleeve 86. The inset 120 may accommodate placement of a second portion 127 of the probe assembly 70, such as the outer ceramic pad 88. Formed on the ID surface 98 of the case, the inset 120 may be sized to fit the outer ceramic pad 88. It is to be understood that dimensions of the bore 122 and inset 120 may vary depending on different portions of the probe assembly 70 installed.

For example, the bore 122 may have a smaller diameter than the inset 120. In the prior art, the probe assembly was pre-assembled within a housing prior to installation. As a result, the housing contained both the lead 80 and the sensor face 84, which limited a size of the sensor face 84 and required a large bore in the case to accommodate the housing of the entire probe assembly. In the present disclosure, on the other hand, the sensor face 84 may have a larger surface area and diameter than the sleeve 86 and lead 80. Furthermore, minimal material of the case 60 may be removed to create the bore 122 and inset 120 to accommodate the first and second portions 125, 127 of the probe assembly 70. Thus, due to the piecemeal installation method disclosed, the case 60 of the present disclosure has increased structural durability, strength, and stiffness of the engine case relative to the prior art.

Figure 13:
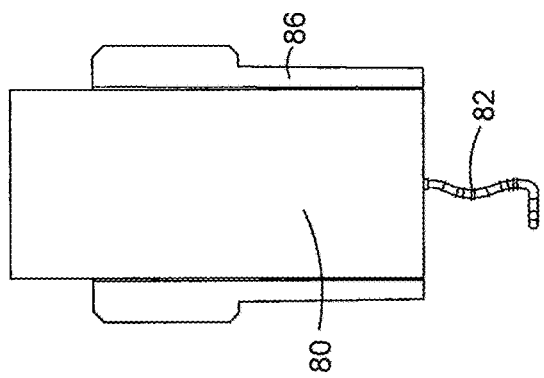
FIG. 13 is a cross-sectional view of the electrical lead and sleeve member of FIG. 12 showing a sensor wire, according to one embodiment of the present disclosure.
Figure 14:
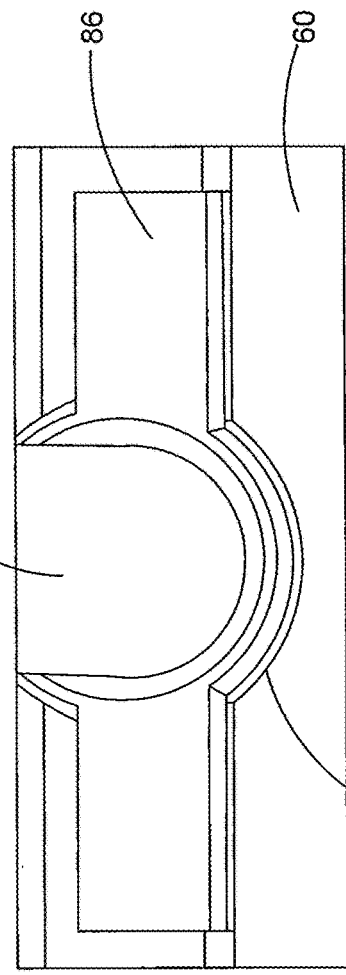
FIG. 14 is a perspective view of the electrical lead and sleeve member of FIG. 12 welded to the case, according to one embodiment of the present disclosure.
Figure 12:
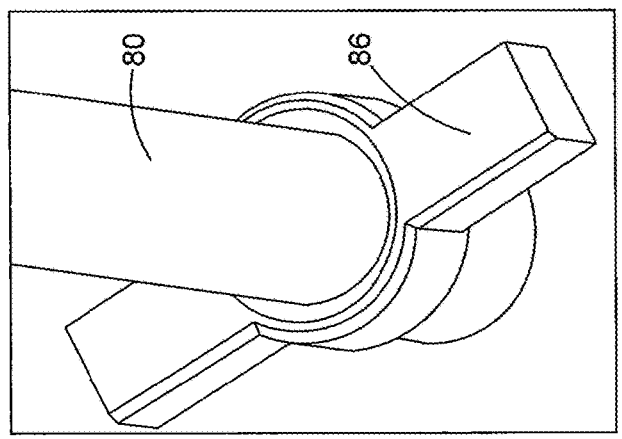
FIG. 12 is a perspective view of an electrical lead of the capacitance probe of FIG. 3 brazed to a sleeve member, according to one embodiment of the present disclosure.

At a next block 104, the lead 80 may be installed into the sleeve 86, as shown best in FIGS. 12-14. For example, the lead 80 may be brazed to the sleeve 86. Other suitable techniques besides brazing, such as welding or soldering, may certainly be possible to join the electric lead 80 to the sleeve member 86. The sleeve 86, containing the lead 80, may then be installed inside the bore 122 of the case 60. The sleeve 86 may be attached to the case 60 via welding, or any other suitable technique. If practical, the sleeve member may be omitted and the electrical lead can be joined directly to the case.

Figure 15:
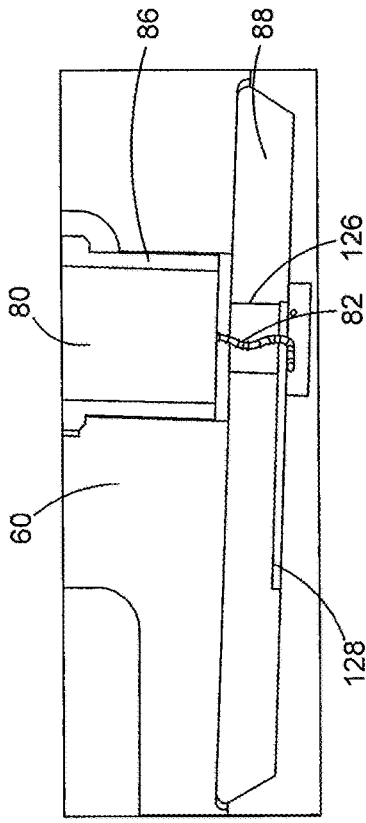
FIG. 15 is a cross-sectional view of an outer ceramic pad adhered to the case and arranged with respect to the electrical lead, sleeve member, and sensor wire of FIG. 14, according to one embodiment of the present disclosure.
Figure 16:
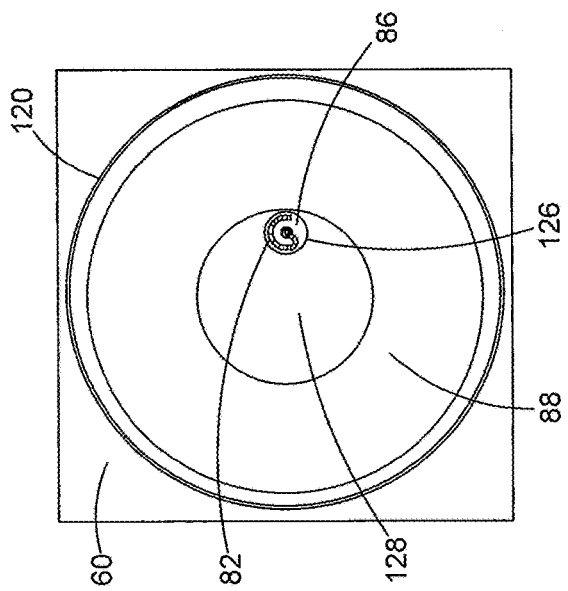
FIG. 16 is a perspective view of FIG. 15 from an ID of the case, according to one embodiment of the present disclosure.

Next, at a block 106, the outer ceramic pad 88 may be installed within the inset 120 of the case 60, as shown best in FIGS. 15-16. The outer ceramic pad 88 may have an aperture 126 to accommodate the sensor wire 82 extending from the lead 80. The outer ceramic pad 88 may then be adhered, such as by glue, to the inset 120 of the case 60. It is to be understood that blocks 102-112 may be performed in a different order than that shown in FIG. 8. For example, block 106 can occur prior to block 104.

Figure 17:
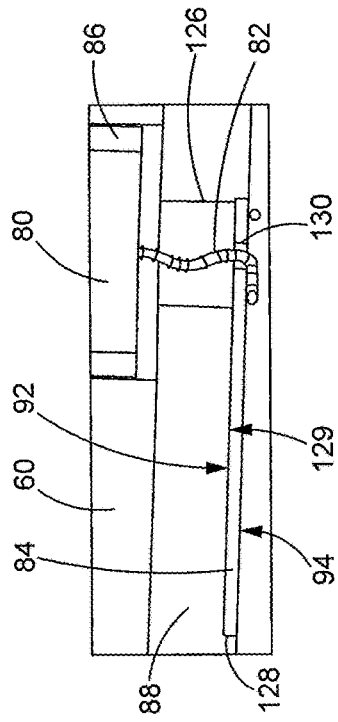
FIG. 17 is a cross-sectional view of a sensor face adhered to the ceramic pad of FIG. 15, according to one embodiment of the present disclosure.
Figure 18:
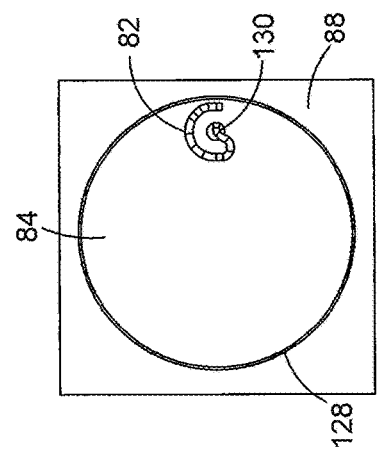
FIG. 18 is a perspective view of FIG. 17 from an ID of the case, according to one embodiment of the present disclosure.

Then, at a block 108, which is depicted best in FIGS. 17-18, the sensor face 84 may be installed within and adhered to a pocket or inset 128 on an inner surface 129 of the outer ceramic pad 88. Glue or other means of adhesion may be used. The sensor face 84 may have an aperture 130 aligned with or concentric to the aperture 126 in the ceramic pad 88. Extending from the lead 80, the sensor wire 82 may pass through the sleeve 86, the aperture 126 in the outer ceramic pad 88, and the aperture 130 in the sensor face 84. After the outer surface 92 of the sensor face 84 is adhered to the inset 128 of the outer ceramic pad 88, the sensor wire 82 is coiled and attached, such as via welding, to the inner surface 94 of the sensor face 84.

Figure 19:
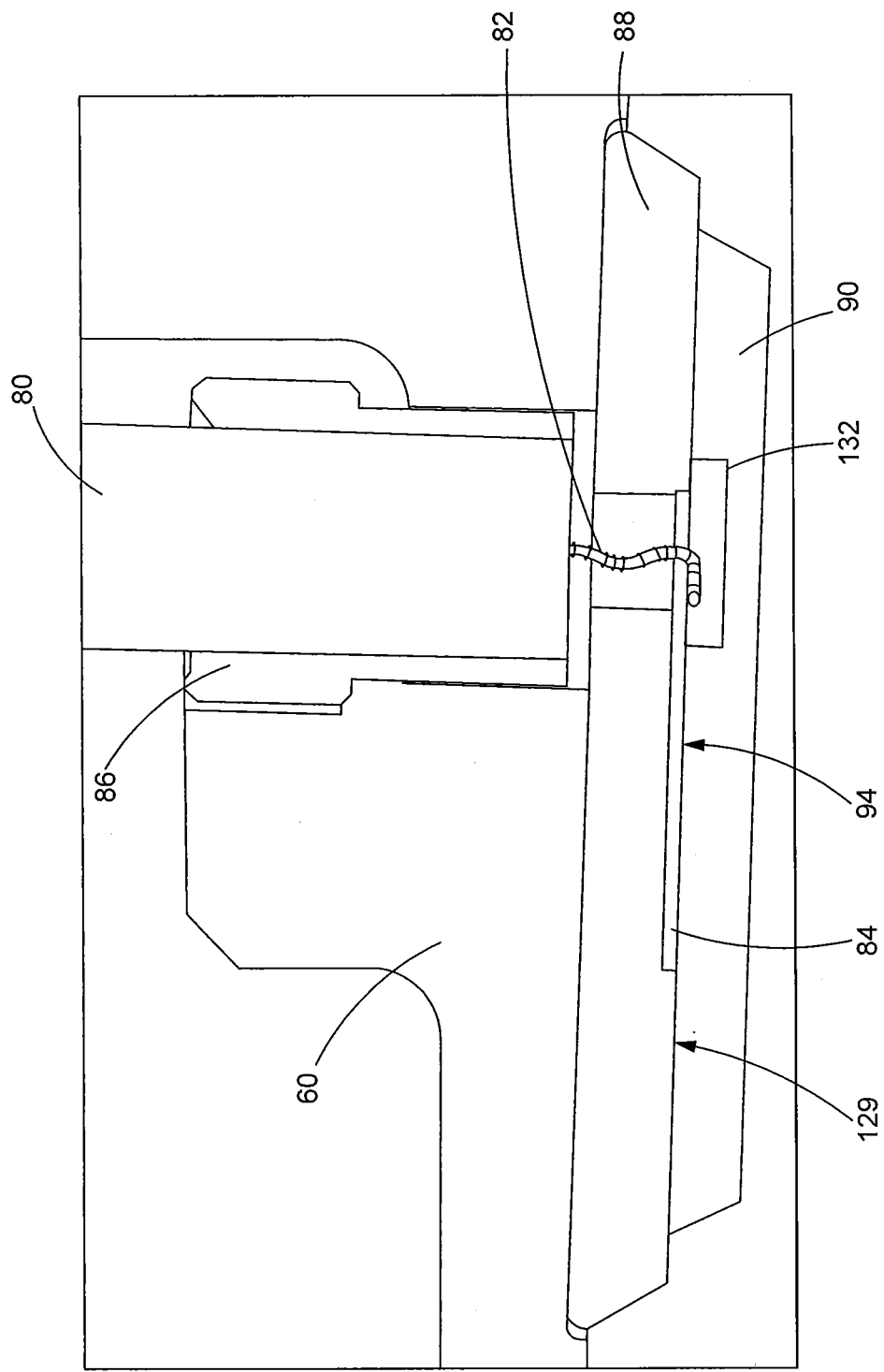
FIG. 19 is a cross-sectional view of an inner ceramic pad adhered to the sensor face and ceramic pad of FIG. 17, according to one embodiment of the present disclosure.

At a next block 110, the inner ceramic pad 90 is adhered to the sensor face 84 and the outer ceramic pad 88, as shown best in FIG. 19. The inner ceramic pad 90 may have a pocket 132 to accommodate the sensor wire 82 in order to prevent obstruction to the sensor wire 82. The inner ceramic pad 90 may be glued, or attached by other suitable means of adhesion, to the inner surface 94 of the sensor face 84 and the inner surface 129 of the outer ceramic pad 88.

Figure 20:
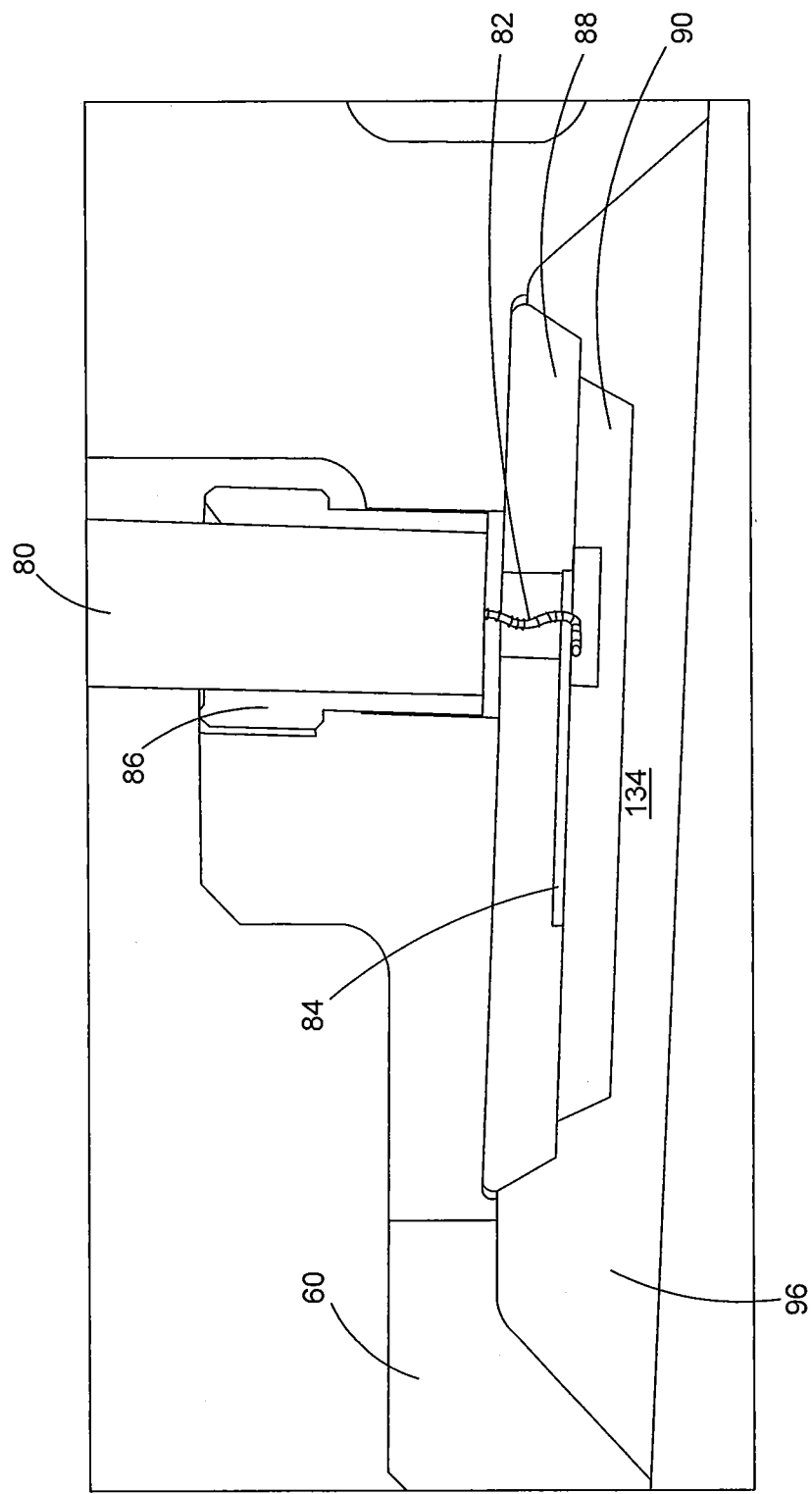
FIG. 20 is a cross-sectional view of an abradable coating sprayed onto the inner ceramic pad, outer ceramic pad, and case of FIG. 19, according to one embodiment of the present disclosure.

Finally, at a block 112, the seal coating 96, such as an abradable coating, may be applied to the case 60, outer ceramic pad 88, and inner ceramic pad 90, as shown best in FIG. 20-22. The coating 96 may be used to retain the probe assembly 70 within the case 60. A portion 134 of the coating 96 may be removed in order to accommodate an electrical field of the sensor face 84, while still allowing a remaining portion 136 of the coating 96 to locate and maintain the position of the probe assembly 70 within the case 60. The portion 134 of the coating 96 may be removed until an inner surface 138 the inner ceramic pad 90 is exposed. The remaining portion 136 may have a chamfer 140 or beveled edge, such as, at a 45 degree angle, although other angles or no bevel is certainly possible.

INDUSTRIAL APPLICABILITY

From the foregoing, it can be seen that the teachings of this disclosure can find industrial application in any number of different situations, including but not limited to, gas turbine engines. Such engines may be used, for example, on aircraft for generating thrust, or in land, marine, or aircraft applications for generating power.

The described disclosure provides an inexpensive, compact and effective probe assembly for a gas turbine engine. The disclosed probe assembly allows for a large sensor face while providing a relatively small diameter bore for the electric lead and sleeve member in the case. This results in increased structural durability, strength, and stiffness of the case, as well as reduced labor required to re-operate the case for installation of the probe assembly. In addition, the re-operation procedures and machine tooling required for installation of the probe assembly are simple and efficient due to the arrangement and geometry of the parts, while requiring no assembly fixtures or installation fixtures. The disclosed probe assembly also provides the advantage of flexibility with similar parts for each stage of the compressor, which reduces lead time. Furthermore, there is low foreign object damage risk due to the probe assembly having a thin sensor face or tack strap.

While the foregoing detailed description has been given and provided with respect to certain specific embodiments, it is to be understood that the scope of the disclosure should not be limited to such embodiments, and that the same are provided simply for enablement and best mode purposes. The breadth and spirit of the present disclosure is broader than the embodiments specifically disclosed and encompassed within the claims appended hereto.

What is claimed is:

1. A method for installing a probe assembly in a case of a gas turbine engine, comprising;
   installing a first portion of the probe assembly within a bore of a first section of the case; and
   installing a second portion of the probe assembly within a second section of the case, the second section of the case being an inset located on an inner diameter surface of the case, wherein the second portion comprises an outer ceramic pad, a sensor, and an inner ceramic pad, the sensor being located between opposing surfaces of the outer ceramic pad and the inner ceramic pad, and wherein the sensor is a capacitance sensor that monitors a distance D between tips of blades within a blade array and the capacitance sensor.

2. The method of claim 1, further comprising building the probe assembly into the case by piecemeal installation of the first and second portions.

3. The method of claim 1, further comprising applying a seal coating to the inner ceramic pad and the inner diameter surface of the case to retain the second portion of the probe assembly within the case.

4. The method of claim 3, wherein the seal coating is an abradable coating.

5. The method of claim 4, further comprising removing a portion of the abradable coating to accommodate an electrical field of the sensor.

6. The method of claim 1, wherein the bore has a smaller diameter than the inset, the outer ceramic pad, the sensor, and the inner ceramic pad.

7. The method of claim 6, further comprising installing a sleeve and a lead within the bore of the case.

8. The method of claim 7, further comprising attaching a sensor wire from the lead to the sensor.

9. The method of claim 1, wherein the inner ceramic pad further comprises a pocket facing the sensor, the pocket being configured to accommodate a wire of the sensor.

10. A case for a compressor section or a turbine section of a gas turbine engine, the case comprising:
    a probe assembly including a first portion positioned within a bore of the case, and a second portion positioned within an inset of the case, the inset being located on an inner diameter surface of the case and the second portion comprising; an outer ceramic pad, a sensor, and an inner ceramic pad, the sensor being located between opposing surfaces of the outer ceramic pad and the inner ceramic pad, wherein the bore has a smaller diameter than the inset, the outer ceramic pad, the sensor, and the inner ceramic pad, and wherein the sensor is a capacitance sensor that monitors a distance D between tips of blades within a blade array of the gas turbine engine and the capacitance sensor.

11. The case of claim 10, further comprising a coating applied to the second portion and the case to retain the probe assembly within the case.

12. The case of claim 10, wherein the bore extends from an outer surface of the case to the inset.

13. The case of claim 10, wherein the first portion includes a lead assembled to a sleeve, and wherein the sleeve is fixed to the bore.

14. The case of claim 10, wherein the sensor is positioned within an inset of the outer ceramic pad.

15. The case of claim 14, wherein the first portion includes a lead assembled to a sleeve, and wherein the sleeve is fixed to the bore, the lead having a sensor wire, the sensor wire being attached to a face of the sensor.

16. The case as in claim 10, wherein the inner ceramic pad further comprises a pocket facing the sensor, the pocket being configured to accommodate a wire of the sensor.

17. A method for retaining a probe within a case of a gas turbine engine, comprising:
    installing a first portion of the probe assembly within a bore of a first section of the case;
    installing a second portion of the probe assembly within a second section of the case, the second section of the case being an inset located on an inner diameter surface of the case, wherein the second portion comprises an outer ceramic pad, a sensor, and an inner ceramic pad, the sensor being located between opposing surfaces of the outer ceramic pad and the inner ceramic pad; and
    using a coating to retain the probe within the case, wherein the probe has a capacitance sensor that monitors a distance D between tips of blades of an array and the capacitance sensor.

18. The method of claim 17, further comprising applying the coating to inner surfaces of the probe and the case, the coating composed of abradable material.

19. The method of claim 18, further comprising removing a portion of the coating to accommodate an electric field between a sensor face of the probe and a blade tip.

20. The method of claim 19, further comprising beveling an edge of a remaining portion of the coating.

\* \* \* \* \*